United States Patent [19]
Peng

[11] Patent Number: 5,272,325
[45] Date of Patent: Dec. 21, 1993

[54] SCANNING DEVICE FOR SYMBOL CODES

[75] Inventor: Ke-Ou Peng, Delft, Netherlands

[73] Assignee: Opticon Sensors Europe B.V., Hoofddorp, Netherlands

[21] Appl. No.: 810,514

[22] Filed: Dec. 19, 1991

[30] Foreign Application Priority Data

Dec. 20, 1990 [NL] Netherlands .................... 9002827

[51] Int. Cl.⁵ .............................................. G06K 7/10
[52] U.S. Cl. ..................................... 235/467; 235/472
[58] Field of Search ................. 235/467, 472; 350/814

[56] References Cited

U.S. PATENT DOCUMENTS 4,850,686  7/1989  Morimoto et al. .................. 350/484

FOREIGN PATENT DOCUMENTS 0032794  7/1981  European Pat. Off. .

OTHER PUBLICATIONS

"Thermal Imaging Systems" by J. M. Lloyd, Plenun Press, N.Y. 1979 pp. 316-320.
"High-Speed Rotating Optical Scanner" by D. H. McMurty, IBM Technical Disclosure Bulletin, vol. 17, No. 2, N.Y. 1974.

Primary Examiner—Harold Pitts
Attorney, Agent, or Firm—Parmelee, Bollinger & Bramblett

[57] ABSTRACT

Scanning device for optically scanning symbol codes, such as bar codes, the device comprising a laser source for producing a scanning beam, a first lens for focussing the scanning beam, a detector for detecting light backscattered by the scanned symbol codes, a second lens for focussing the backscattered light onto the detector, first and second rotatable deflection means for both transmitting and deflecting the scanning beam so as to generate a scanning pattern, and drive means for rotating the deflection means, wherein both the first and the second deflection means comprise triangular prisms.

16 Claims, 3 Drawing Sheets

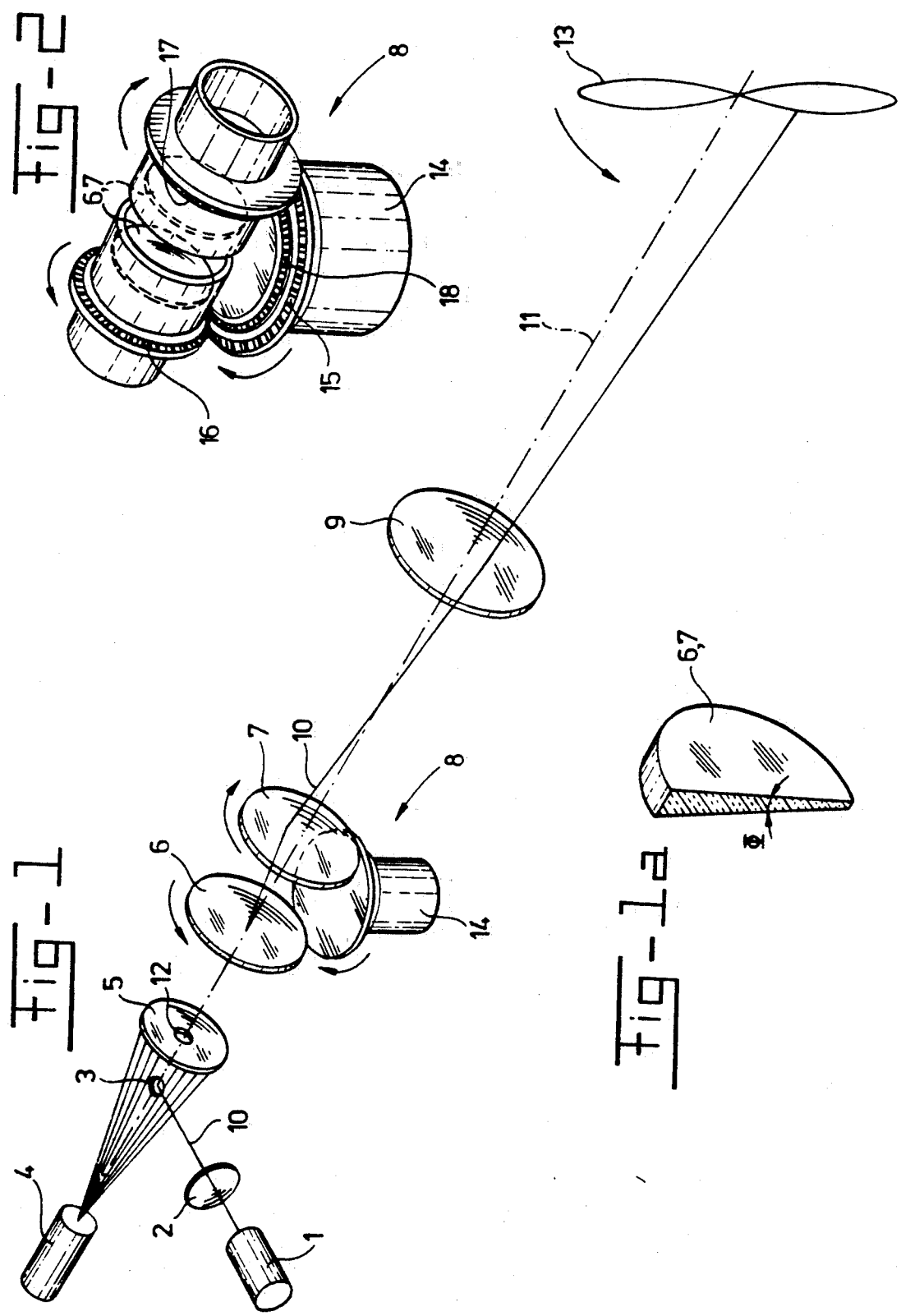

SCANNING DEVICE FOR SYMBOL CODES

BACKGROUND OF THE INVENTION

The invention relates to a scanning device for optically scanning symbol codes, comprising a laser source for producing a scanning beam, a first lens for focussing the scanning beam, a detector for detecting light backscattered by the scanned symbol codes, a second lens for focussing the backscattered light onto the detector, first and second rotatable deflection means for both transmitting and deflecting the scanning beam so as to generate a scanning pattern, and drive means for rotating the deflection means.

Such a device, as is disclosed by European Patent 0 032 794 B1, makes it possible to scan symbol codes, such as bar codes, optically and to read out and recognise the information contained in the code by detecting the reflected light. This information relates in general to an item to which the code is affixed. In order to ensure that the code can be reliably read out regardless of the position of the item with respect to the scanning device and the relative position of the code on the item, the item is scanned with a predetermined scanning pattern. That is to say, the light beam describes a pattern on the item, the pattern being chosen in such a way that the scanning of the symbol code in the correct manner is ensured.

In order to generate such a scanning pattern, the known device is provided with deflection means which consist of a hologram and a further deflection element, such as a Fresnel lens. Such deflection means have the disadvantage that, in practice, they have a poor efficiency of, for example, 50%.

In the publication "Thermal imaging systems" by J. M. Lloyd, Plenum Press, New York, 1979, pages 316-320, the general principles of the use of rotating wedges for generating scanning patterns is disclosed. This publication does, however, not suggest the application of these general principles to scanning devices such as bar code scanners, nor does this publication disclose the technical measures necessary to realize a bar code scanner embodying these principles. That is, the said publication does not disclose a compact arrangement of a bar code scanning device. More specifically, the said publication does not suggest a bar code scanner in which both rotatable prisms are mounted in a compact and advantageous structure of pinions and crown wheels, this structure providing the required rotation of the prisms.

The article "High-speed rotating optical scanner" by D. H. McMurty, IBM Technical Disclosure Bulletin, volume 17, no. 2, New York 1974, discloses a bar code reader having rotating prisms for rotating the image of symbols to be read. The prisms are not used for generating a scanning pattern by deflecting a laser beam. Furthermore, the prisms used in this known arrangement are image-inverting Dove prisms. The size and consequently the weight of three such prisms makes this known arrangement less suitable for use in a hand-held scanner. Furthermore, the rather bulky drive means shown in said publication preclude the use as a hand-held scanner.

SUMMARY OF THE INVENTION

The object of the invention is therefore to provide another and compact device for optically scanning symbol codes, said device being provided with simple and relatively inexpensive deflection means which have, in practice, an excellent efficiency.

Another object of the invention is to provide suitable drive means for such a scanner, the drive means enabling a compact structure of the scanner.

In order to meet these objects, the scanning device according to the invention is characterized in that both deflection means comprise triangular prisms. Such prisms are easy to manufacture and are therefore relatively inexpensive. In addition, a combination of two rotating prisms makes it possible to obtain a large variety of scanning patterns by, for example, using different rotation speeds and/or different prism angles and/or different refractive indexes.

Although various practical scanning patterns can be obtained by using prisms rotating in the same direction, a preferred embodiment of the invention is characterized in that the prisms have opposite directions of rotation. Such an embodiment allows a plurality of advantageous scanning patterns to be produced, i.e. scanning patterns with which symbol codes, such as bar codes, can be scanned effectively.

In principle, the prism angle, that is to say the angle between the entry face and the exit face of each prism, can have a wide variety of values. According to the invention, a scanning device which has a compact structure and which generates the desired scanning patterns can preferably be produced by using prisms whose prism angle is less than 15°. Suitable values are, for example, 6°, 8° and 10°. As a result of this small angle, the prisms can be relatively thin and their weight is consequently low. This is especially important for scanning devices which are held in the hand when in use. A further advantage of the use of said prisms is their flexibility in forming a high-density scanning pattern with a limited directional angle.

Although both prisms may have the same prism angle, a preferred embodiment of the invention is provided with prisms having a mutually different prism angle. The periphery of the prisms can have any desired shape, but as compact as possible a structure of the scanning device according to the invention is obtained with prisms which are circular. The prisms may be made of glass, plastic or any other suitable material.

The means for generating a light beam comprise, for example, a laser, such as a diode laser which is suitable, in particular, for a compact structure. However, other light sources can also be used. In order to obtain a focused light beam, a lens is preferably present for focusing the light emitted by the laser.

In a preferred embodiment of the invention, the laser is mounted at an angle with respect to the axes of rotation of the prisms. To direct the laser light focused by the lens at the prisms, the preferred embodiment is provided with a reflective element which may be a mirror or a prism. As a result of using a reflective element, the angle of the laser with respect to the deflection means can be chosen as desired, with the light beam nevertheless incident on the deflection means at the desired angle.

In principle, the light reflected by the symbol code can be detected by a separate detector. The device according to the invention is, however, preferably provided with an built-in detector. In order to obtain a maximum light yield in the detector, the reflected light is preferably focused by a further lens. According to the preferred embodiment of the invention, the said lens is provided with an aperture for transmitting the light emitted by the laser.

The relative size of the scanning pattern on the item to be scanned depends, inter alia, on the distance of the item from the scanning device. In order, therefore, to be able to adjust the size of the scanning pattern regardless of the mutual distance between item and scanning device, the preferred embodiment of the invention is provided with a third lens.

In order to cause the prisms to rotate, various drive means are possible. The drive means of the device according to the invention preferably comprise a motor with two crown wheels, and also two pinions meshing with said crown wheels and capable of being rotated in opposite directions, a prism being mounted in each pinion in such a way that the centres of prism and pinion coincide. This achieves the result that the prisms have an opposite direction of rotation, while the dimensions of the assembly of drive means and prisms are minimal. By using two crown wheels and pinions having different diameters, the mutual rotation speeds of the prisms can be varied. Preferably, the axes of the pinions also coincide with the light beam directed at the deflection means and incident on the first prism.

The scanning device according to the invention has a compact structure and is therefore suitable to be designed as a hand-held scanner. The housing of the device according to the invention is preferably adapted to this purpose, for example by being provided with a handle.

The invention will be explained in greater detail with reference to the drawings.

BRIEF DESCRIPTION OF THE DRAWINGS

FIG. 1 shows a diagrammatic perspective view of the most prominent parts of the preferred embodiment of the device according to the invention; and FIG. 1a shows a cut-away view of a prism from the device of FIG. 1;

FIG. 2 shows the drive means according to the invention in perspective;

DETAILED DESCRIPTION OF THE PREFERRED EMBODIMENTS

Figure 3A:
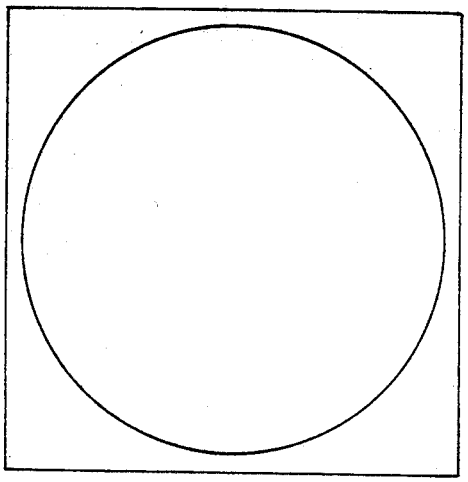
FIGS. 3a, 3b, 3c, and 3d shows schematically various scanning patterns which can be generated with the device according to the invention.

FIG. 1 shows the most important parts of the device according to the invention in perspective. The device comprises a laser 1, a focusing lens 2, a mirror 3, a detector 4, a detection lens 5, a first prism 6, a second prism 7, drive means 8 and an adjustment lens 9. The laser 1, which is preferably a diode laser, produces light which is concentrated by the focusing lens 2. The light beam 10 thus formed is deflected onto the optical axis 11 of the device by the mirror 3. The light beam 10 then enters the detection lens 5 through an aperture 12 provided for the purpose. The first prism 6 deflects the light beam 10 at a first angle from the optical axis 11. The second rotating prism 7 causes a further deflection of the light beam 10 through a second angle. The light beam 10 thus deflected by the two prisms then passes through the adjustment lens 9 so as to form a scanning pattern 13 on the scanning surface (not shown). The said adjustment lens can be used to adjust the size of the scanning pattern to the symbol or bar code. As a result of this, the linear scanning speed can also be reduced.

The light reflected from the scanning surface passes through the adjustment lens 9, the second prism 7 and the first prism 6, and then reaches the detection lens 5. The reflected light is focused on the detector 4 by the detection lens 5. FIG. 1a shows a cut-away view of the prism 6, 7, in which the prism angle $\Phi$ is indicated.

FIG. 2 shows a preferred embodiment of the drive means 8. These comprise a motor 14 with two crown wheels 15, 18 of different diameters and two pinions 16, 17 meshing with said crown wheels and capable of being rotated in opposite directions. Mounted in each pinion 16, 17 is a circular prism 6, 7. In the embodiment shown in FIG. 2, the axes of rotation of the prisms substantially coincide with the laser beam incident upon the first prism 6. As the prisms 6 and 7 are mounted inside the pinions 16 and 17, a very compact structure is obtained. This is especially advantageous if the inventive scanner is to be used as a hand-held scanner.

It is obvious that other drive embodiments are also conceivable, for example in the case where both prisms have the same direction of rotation. Each prism can also have, if desired, its own drive motor, or one prism could possibly be stationary. Various patterns can be generated by controlling the motor speed(s).

Figure 3B:
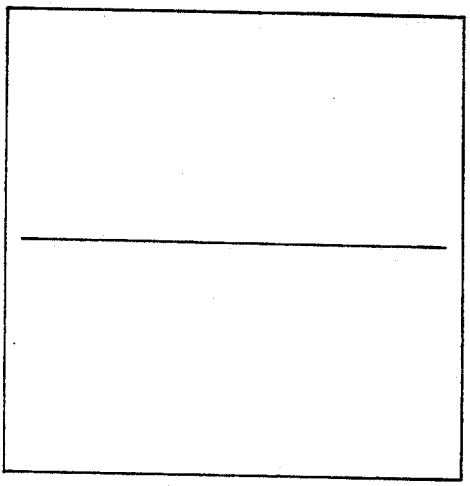
Figure 3C:
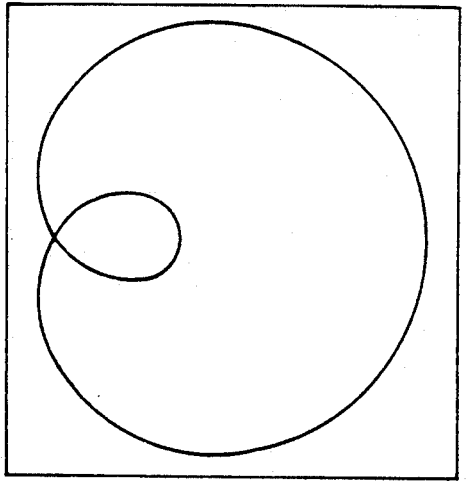
Figure 3D:
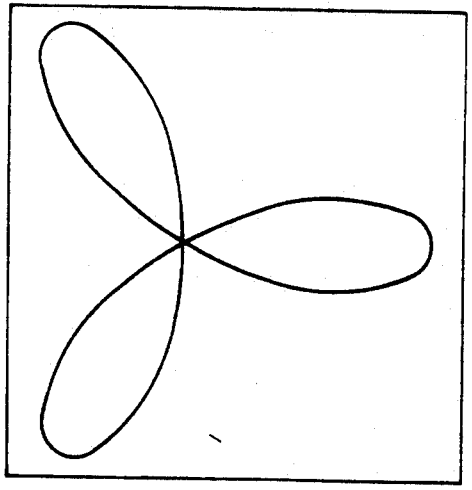

FIG. 3 shows scanning patterns which can be obtained with the aid of the device according to the invention if both prisms have a prism angle of 8° and an identical refractive index of 1.5. A different refractive index produces a different pattern. Various other patterns are also obtained by choosing different speed ratios. In FIG. 3a, the speed ratio is 1, that is to say, the prisms rotate at the same speeds in the same direction. In FIG. 3b, the speed ratio is −1, that is to say, the prisms rotate at the same speed in opposite directions. In FIG. 3c, the speed ratio is $\frac{1}{2}$, that is to say the prisms rotate in the same direction but the rotation speed of the first prism is half that of the second prism. FIG. 3d shows a pattern which is obtained if the speed ratio is $-\frac{1}{2}$, that is to say, the prisms rotate in opposite directions, the rotation speed of the first prism being half that of the second prism.

Figure 4A:
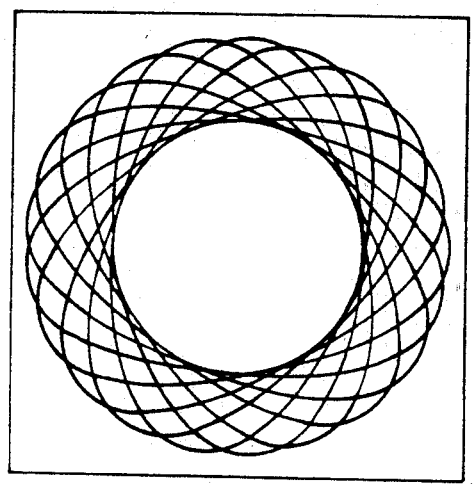
FIGS. 4a, 4b, 4c, and 4d shows still other scanning patterns which can be obtained with the device according to the invention.
Figure 4B:
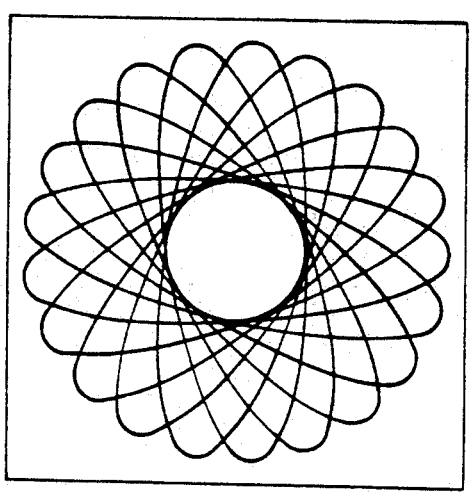
Figure 4C:
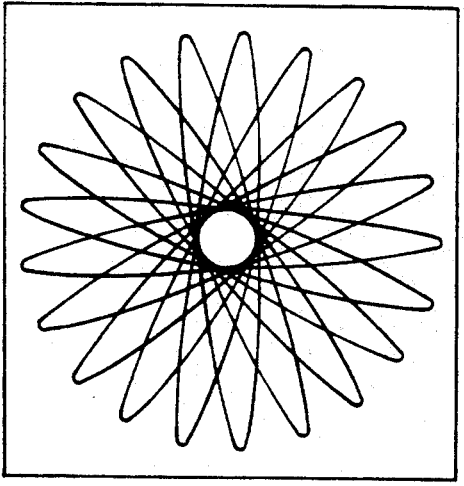
Figure 4D:
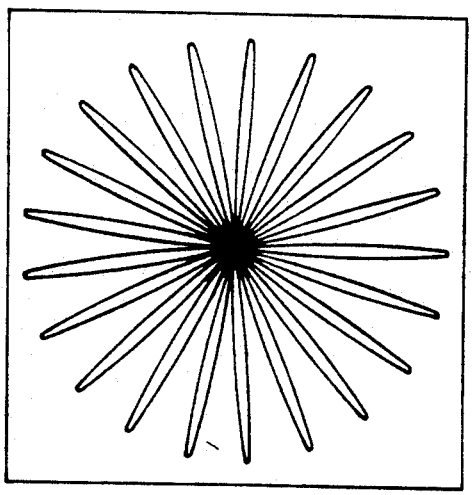

FIG. 4 shows the effect of choosing different prism angles. The scanning patterns shown in FIG. 4 have all been obtained with a speed ratio of −1.1 and a refractive index for both prisms of 1.5. The scanning pattern of FIG. 4a has been obtained with a first prism angle of 8° and a second prism angle of 2°, while the scanning pattern of FIG. 4b has been obtained with a first prism angle of 8° and a second prism angle of 4°. The scanning pattern of FIG. 4c has been obtained with a first prism angle of 8° and a second prism angle of 6°, while in FIG. 4d both prism angles are 8°.

It will be understood that further embodiments are possible without departing from the scope of the present invention.

I claim:

1. A scanning device for optically scanning symbol codes, such as bar codes, comprising a laser source for producing a scanning beam, a first lens for focussing the scanning beam, a detector for detecting light backscattered by the scanned symbol codes, a second lens for focussing the backscattered light onto the detector, first and second rotatable deflection means comprising first and second triangular prisms for both transmitting and deflecting the scanning beam so as to generate a scanning pattern on the symbol codes being scanned, and drive means for rotating said first and second prisms having rotational axes which coincide with the optical axis of said scanning beam.

2. The scanning device according to claim 1, wherein said prisms have opposite directions of rotation.

3. The scanning device according to claim 1, wherein the prism angle of said first and second prisms is less than 15°.

4. The scanning device according to claim 1, wherein said prisms have mutually different prism angles.

5. The scanning device according to claim 1, further comprising a reflective element for directing the light focused by the first lens at said deflection means.

6. The scanning device according to claim 1, wherein said second lens is provided with an aperture for transmitting said scanning beam focused by said first lens.

7. The scanning device according to claim 1, provided with a third lens for determining the size of the scanning pattern.

8. A scanning device for optically scanning symbol codes, such as bar codes, comprising a laser source for producing a scanning beam, a first lens for focussing said scanning beam, a detector for detecting light backscattered by the scanned symbol codes, a second lens for focussing the backscattered light onto said detector, first and second rotatable deflection means comprising triangular prisms for both transmitting and deflecting said scanning beam so as to generate a scanning pattern on the symbol codes being scanned, and drive means for rotating said deflection means, wherein said drive means comprise a motor having two crown wheels of different diameters, and two pinions meshing with said crown wheels and capable of being rotated in opposite directions, and wherein a prism is mounted in each pinion in such a way that the centers of said prisms and said pinions coincide.

9. The scanning device according to claim 8, wherein the axes of said pinions substantially coincide with said light beam incident on the deflection means.

10. Scanning device according to claim 8, wherein the prisms are circular.

11. Scanning device according to claim 8, wherein the prisms have opposite directions of rotation.

12. The scanning device according to claim 8, wherein the prism angle of said prisms is less than 15°.

13. The scanning device according to claim 8, wherein said prisms have mutually different prism angles.

14. The scanning device according to claim 8, wherein said second lens is provided with an aperture for transmitting the scanning beam focused by said first lens.

15. The scanning device according to claim 8, provided with a third lens for determining the size of the scanning pattern.

16. The scanning device according to claim 8, having a housing such that the device can be held in the hand during operation.

* * * * *